(12) United States Patent
Oda et al.

(10) Patent No.: US 6,882,363 B1
(45) Date of Patent: Apr. 19, 2005

(54) VIDEO SIGNAL PROCESSING APPARATUS

(75) Inventors: Kazuo Oda, Yokohama (JP); Masaki Kariya, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/492,289

(22) Filed: Jan. 27, 2000

(30) Foreign Application Priority Data

Jan. 29, 1999 (JP) ........................................... 11-022141

(51) Int. Cl.[7] .............................. H04N 9/73; H04N 5/20; H04N 5/222; H04N 5/213

(52) U.S. Cl. .................... 348/226.1; 348/255; 348/370; 348/607

(58) Field of Search ........................... 348/226.1, 227.1, 348/228.1, 229.1, 370, 371, 230.1, 255, 296, 607

(56) References Cited

U.S. PATENT DOCUMENTS

| | | | | |
|---|---|---|---|---|
| 4,774,588 A | * | 9/1988 | Noda et al. .................. | 348/297 |
| 4,959,727 A | | 9/1990 | Imaide et al. | |
| 5,293,238 A | * | 3/1994 | Nakano et al. ........... | 348/226.1 |
| 5,966,173 A | * | 10/1999 | Inuiya et al. ............... | 348/296 |
| 6,147,706 A | * | 11/2000 | Inuiya et al. ............. | 348/226.1 |
| 6,271,884 B1 | * | 8/2001 | Chung et al. ............... | 348/370 |
| 6,567,123 B1 | * | 5/2003 | Hashimoto ............... | 348/229.1 |
| 6,710,818 B1 | * | 3/2004 | Kasahara et al. ........... | 348/607 |
| 2002/0154225 A1 | * | 10/2002 | Matsumoto et al. ..... | 348/229.1 |
| 2002/0158971 A1 | * | 10/2002 | Daiku et al. ............. | 348/226.1 |
| 2003/0142223 A1 | * | 7/2003 | Luo et al. ................. | 348/229.1 |
| 2004/0165084 A1 | * | 8/2004 | Yamamoto et al. ...... | 348/226.1 |

FOREIGN PATENT DOCUMENTS

| | | | | |
|---|---|---|---|---|
| EP | 0 971 534 A2 | | 1/2000 | |
| EP | 971534 A2 | * | 1/2000 | .......... H04N/5/243 |
| GB | 2284318 A | * | 5/1995 | .......... H04N/5/235 |
| JP | 56149183 A | * | 11/1981 | ............ H04N/5/34 |
| JP | 01204578 A | * | 8/1989 | .......... H04N/5/335 |
| JP | 02306776 A | * | 12/1990 | ............ H04N/5/21 |
| JP | 02306777 A | * | 12/1990 | ............ H04N/5/21 |
| JP | 07298130 A | * | 11/1995 | .......... H04N/5/235 |
| JP | 08265652 A | * | 10/1996 | .......... H04N/5/335 |
| JP | 10098650 A | * | 4/1998 | .......... H04N/5/335 |
| JP | 11069217 A | * | 3/1999 | .......... H04N/5/225 |
| JP | 11155106 A | * | 6/1999 | .......... H04N/5/335 |

OTHER PUBLICATIONS

Thomson–Derwent machine assisted translation of Japanese Publ. No. 10–098650 A.*

* cited by examiner

Primary Examiner—Aung Moe
Assistant Examiner—John M. Villecco
(74) Attorney, Agent, or Firm—Louis Woo

(57) ABSTRACT

An automatic gain controlling circuit controls a gain of a video signal from an imager having an electronic shutter function according to a gain control signal. An average detecting circuit detects an average level of a luminance signal of the video signal. An automatic exposure controlling circuit generates the gain control signal according to the luminance average level in response to a mode signal indicative of the cycles per second of the ac line and generates a timing signal corresponding to the ac line and a shutter speed control signal together with electronic shutter control signal generation circuit at a unit of the voltage variation cycle of the ac line according to the luminance average level such that a shutter interval of the imager is changed stepwise and each of the shutter intervals is an integer times the voltage variation cycle of the ac line. The automatic exposure controlling range is expanded by changing the shutter speed stepwise from ¹⁄₁₀₀ sec, ²⁄₁₀₀ sec ³⁄₁₀₀ sec at 50-Hz-ac area, for example, to provide coarse exposure controlling and fine automatic gain controlling is provided every shutter interval to suppress flicker.

2 Claims, 5 Drawing Sheets

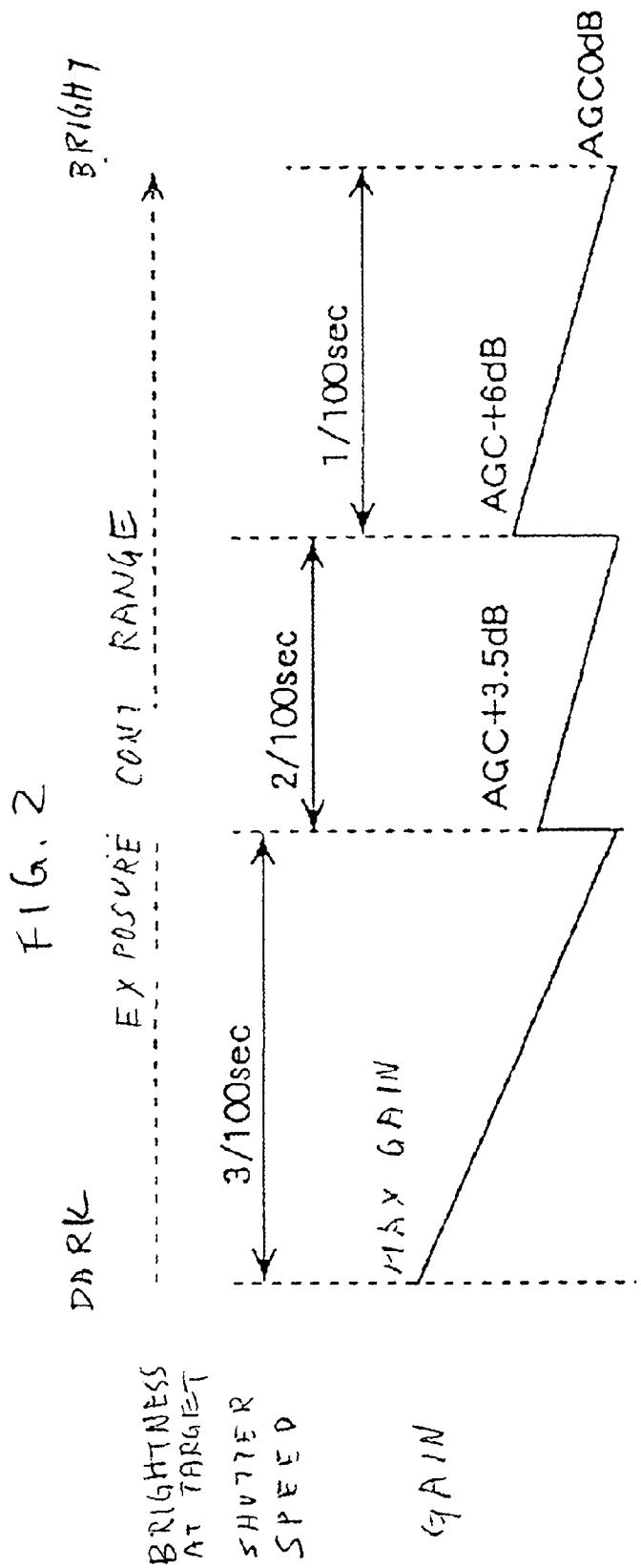

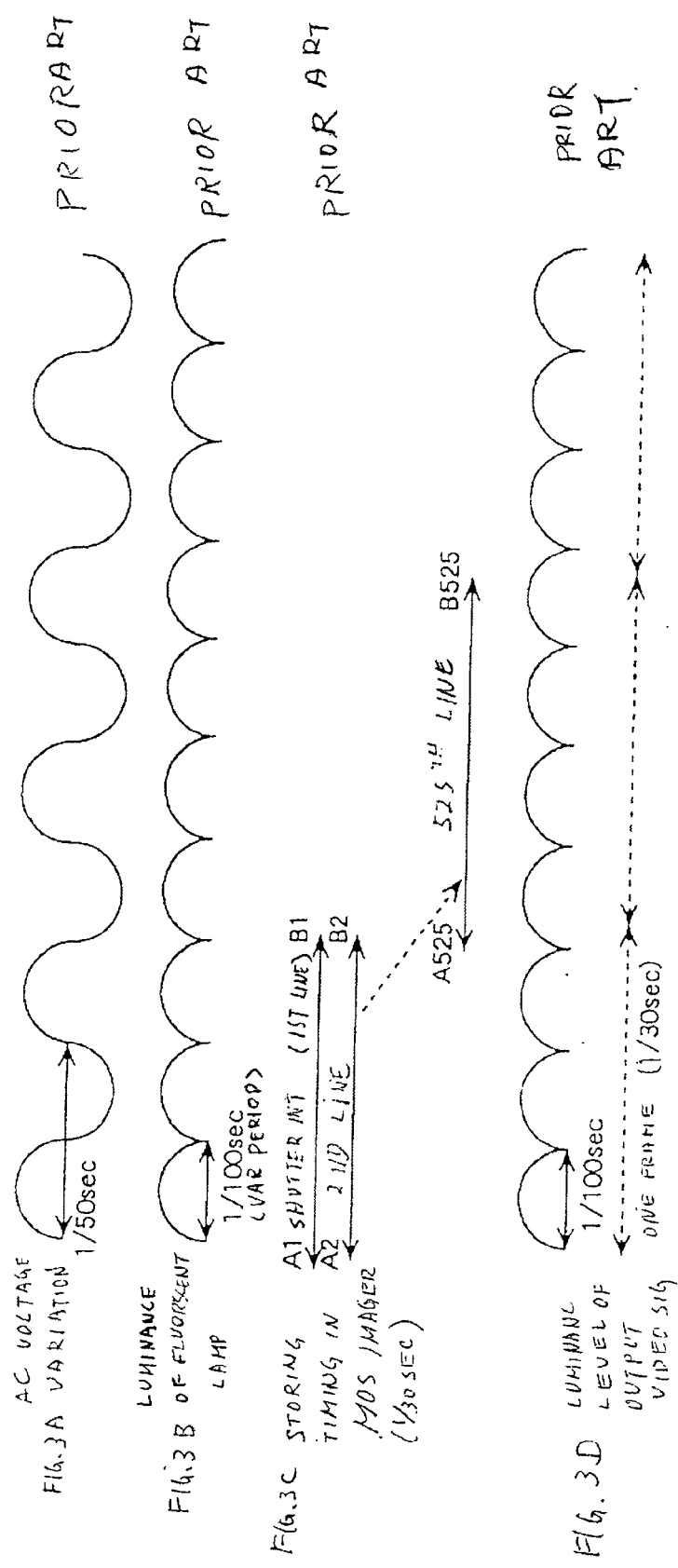

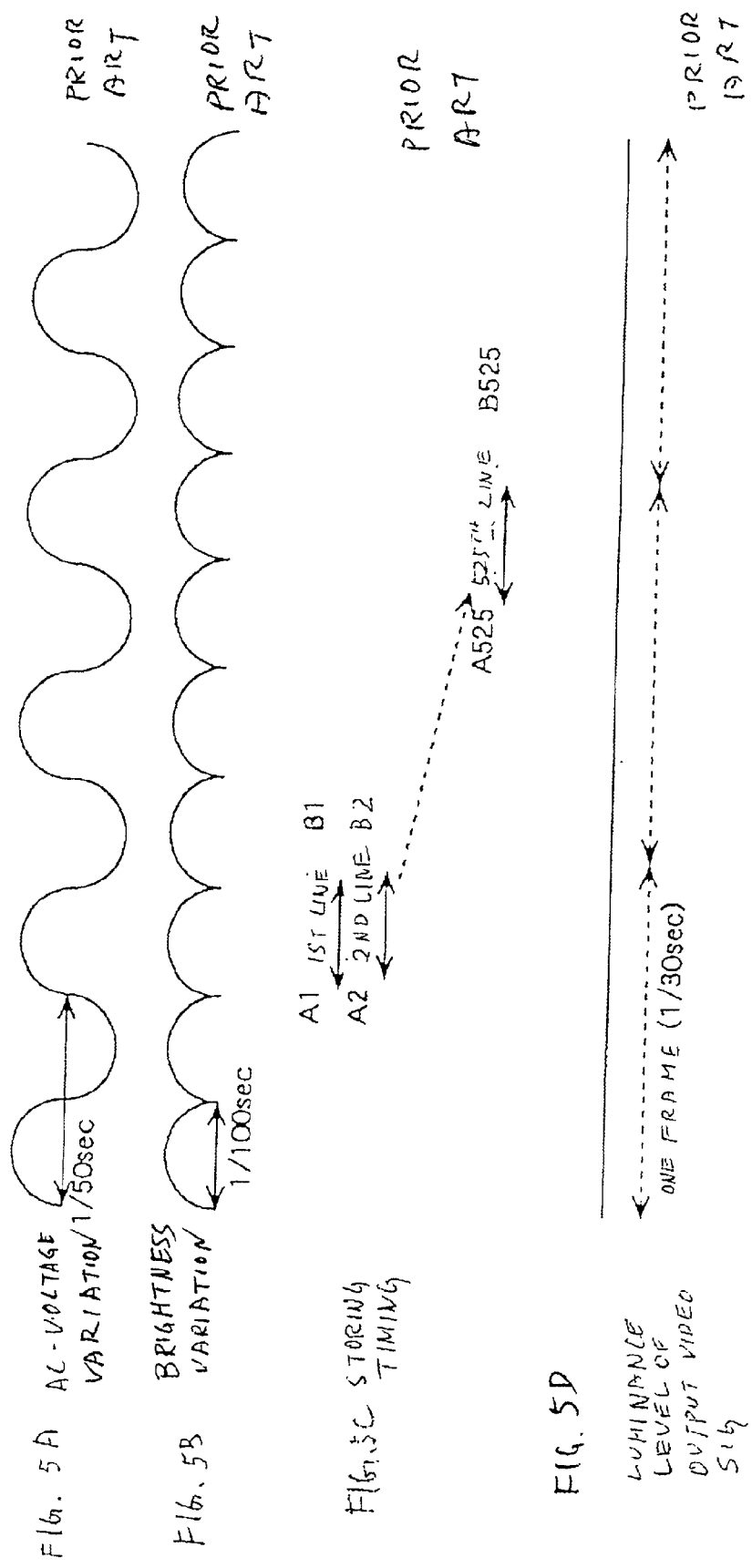

VIDEO SIGNAL PROCESSING APPARATUS

BACKGROUND OF THE INVENTION

1. Field of the Invention

This invention relates to a video signal processing apparatus. More specifically, this invention relates to a video signal processing apparatus for processing a video signal to reduce flicker.

2. Description of the Prior Art

A video signal processing apparatus for processing a video signal in which flicker due to illumination is suppressed with an automatic gain controlling circuit is known.

When image is taken by a video camera under illumination by fluorescent lamps, there is a problem of flicker. A luminance level of the fluorescent lamp periodically changes with a voltage of the ac line. FIGS. 3A and 3B are illustrations of prior art showing voltage change and luminance change of fluorescent lamps. If the cycle of the voltage of ac line is 50 Hz as shown in FIG. 3A, the luminance of a fluorescent lamp changes at 100 Hz as shown in FIG. 3B. If the cycle of the voltage of an ac line is 60 Hz, the luminance of the fluorescent lamp changes at 120 Hz as well known.

FIGS. 3C and 3D are illustrations showing operation of a prior art video camera. If a video camera or an electronic camera employing a MOS type of imager is used under illumination by fluorescent lamps at a shutter speed of 1/30 sec, charge storing timings and the luminance level of the video signal are shown in FIGS. 3C and 3D.

The MOS type of imager outputs a first line from timing A1 to B1 and a second line from timings A2 to B2 which timings A2 and B2 are slightly shifted in time base from the timings A1 and B1. The last line (525th line) is detected at timings A525 and B525 within the one frame (1/30 sec). As shown in FIG. 3B, the luminance level changes, so that a luminance level of the image changes at a cycle of 1/100 sec, which is sensed by a watcher as flicker. Particularly, in the case of the MOS type of imager, the reproduced image shows stripes over the to-be-reproduced image because the image storing timings are different every line. In the case of the CCD type of imager, because image storing timings are the same over all lines in the frame, flicker does not occur within the frame. However, the luminance signal level changes every frames in the CCD type of imager.

FIG. 4 is a block diagram of a prior art video signal processing apparatus which can suppress flicker. An output signal of an imager 11 is supplied to an automatic gain control circuit 12 which controls its gain in accordance with a gain control signal so as to keep the average level constant. An output signal of the automatic gain control circuit 12 is converted into a digital signal by an a/d converter 13. The digital signal from the a/d converter 13 is supplied to an average detecting circuit 14 which detects an average level of the digital signal. The average value is supplied to a gain controlling signal generation circuit 15 which generates the gain control signal such that the gain is controlled to keep the average level constant.

On the other hand, an electronic shutter signal generation circuit 16 generates an electronic shutter signal of which shutter speed is fixed to 1/100 sec at the 50-Hz-ac area and fixed to 1/30 sec or 1/60 sec at the 60-Hz-ac area. FIGS. 5A to 5D show prior art video signal processing operation at the 50-Hz-ac area. The frame interval is 1/30 sec. On the other hand, the shutter speed is fixed to 1/100 sec at that area so that the exposure interval (1/100 sec) agrees with the luminance variation period of fluorescent lamps. Accordingly, as shown in FIG. 5B, the luminance level of the video signal from the MOS type of imager is constant, wherein flicker is suppressed. In this prior art video signal processing circuit, the gain controlling is provided by only the automatic gain control circuit 12, so that the automatic exposure controlling is limited by the dynamic range of the automatic gain controlling circuit 12.

SUMMARY OF THE INVENTION

The aim of the present invention is to provide a superior video signal processing apparatus.

According to the present invention there is provided a video signal processing apparatus including: an automatic gain controlling circuit for controlling a gain of a video signal from an imager having an electronic shutter function in accordance with a gain control signal; an average detecting circuit for detecting an average luminance level of the video signal; a gain control signal generation circuit for generating the gain control signal in accordance with the average luminance level; and a shutter speed control signal generation circuit responsive to a mode signal indicative of a cycle per second of an ac line for generating a shutter speed control signal at a unit of the voltage variation cycle (period) of the ac line in accordance with the average luminance level such that a shutter interval of the imager is changed stepwise and each of the shutter intervals is an integer times the voltage variation cycle (period) of the ac line.

In the video signal processing apparatus, the gain control signal generation circuit generates the gain control signal such that the gain of the automatic gain controlling circuit is further controlled stepwise at the unit of the voltage variation cycle (period) of the ac line in accordance with the detected average.

In the video signal processing apparatus, the shutter interval is controlled in accordance with the detected average luminance level and the shutter interval.

BRIEF DESCRIPTION OF THE DRAWINGS

The object and features of the present invention will become more readily apparent from the following detailed description taken in connection with the accompanying drawings in which:

FIGS. 3A and 3B are graphical drawings of prior art showing voltage variation and luminance variation of fluorescent lamps;

FIGS. 3C and 3D are illustrations showing operation of a prior art video camera;

FIGS. 5A to 5D are graphical drawings showing operation of the prior art video signal processing apparatus at a 50-Hz-ac area.

The same or corresponding elements or parts are designated with like references throughout the drawings.

DETAILED DESCRIPTION OF THE INVENTION

Hereinbelow will be described an embodiment of this invention.

Figure 1:
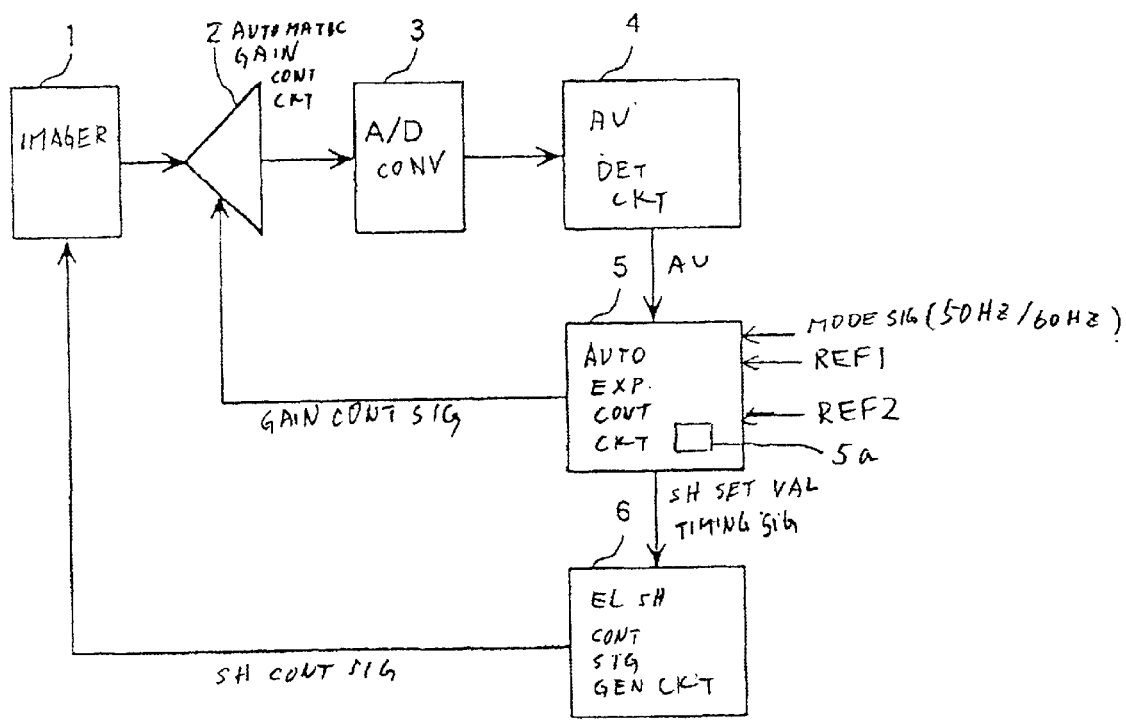
FIG. 1 is a block diagram of a video signal processing apparatus of an embodiment of the present invention, wherein an imager is also shown.
Figure 4:
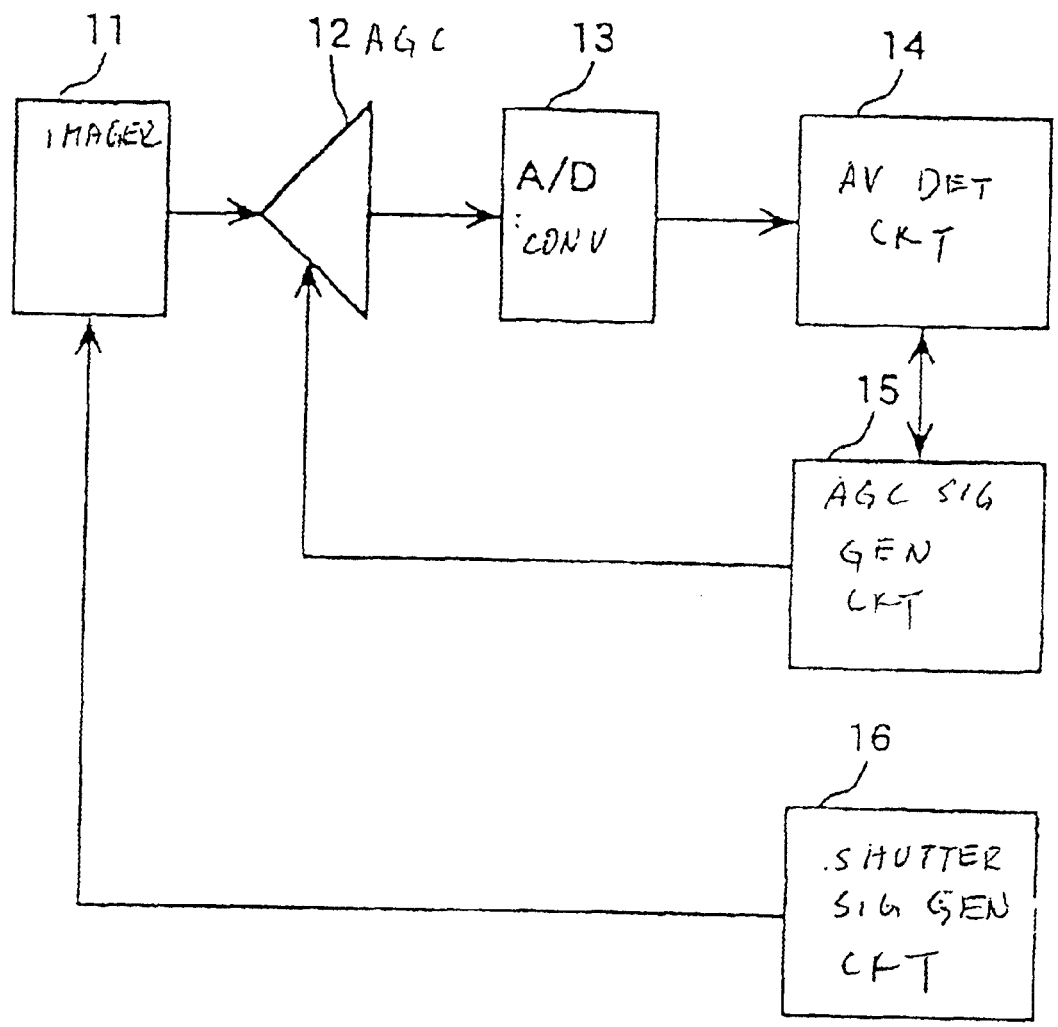
FIG. 4 is a block diagram of a prior art video signal processing apparatus.
Figure 1:
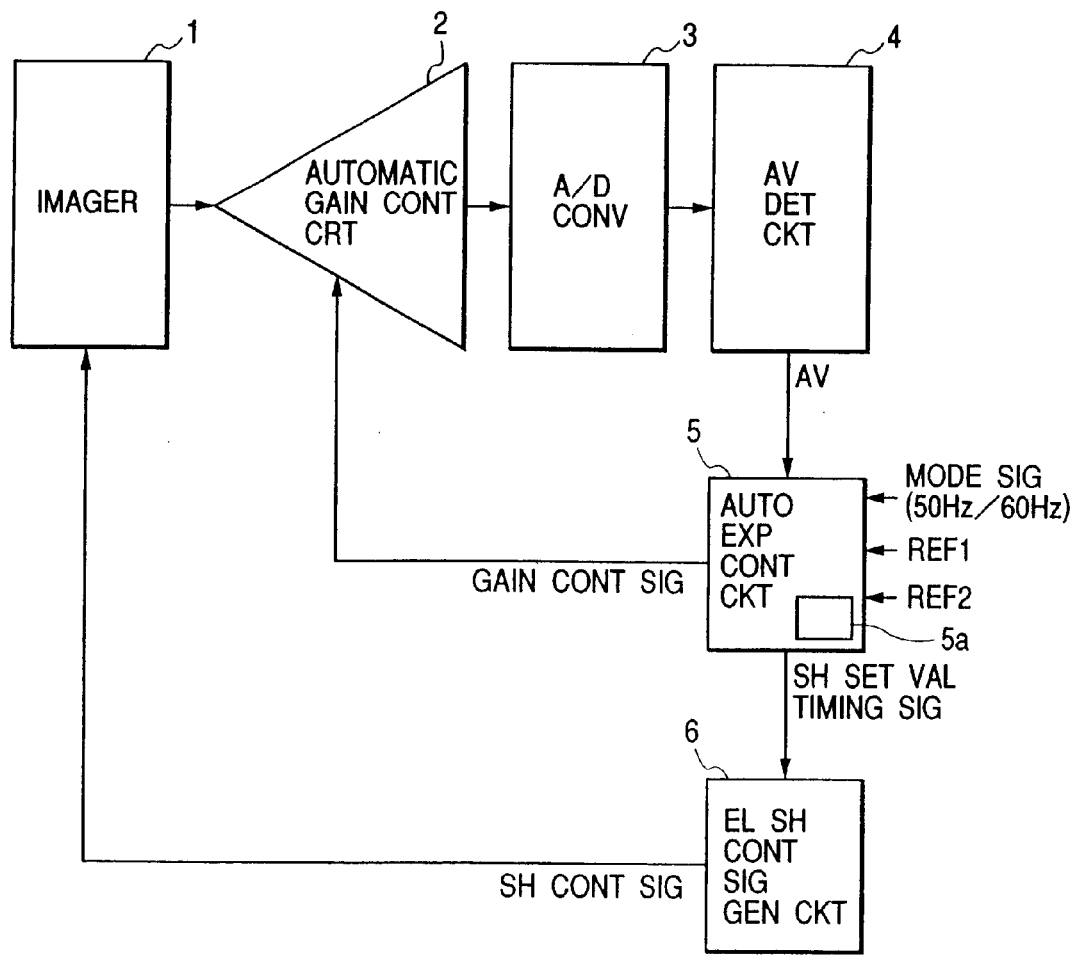
Figure 2:
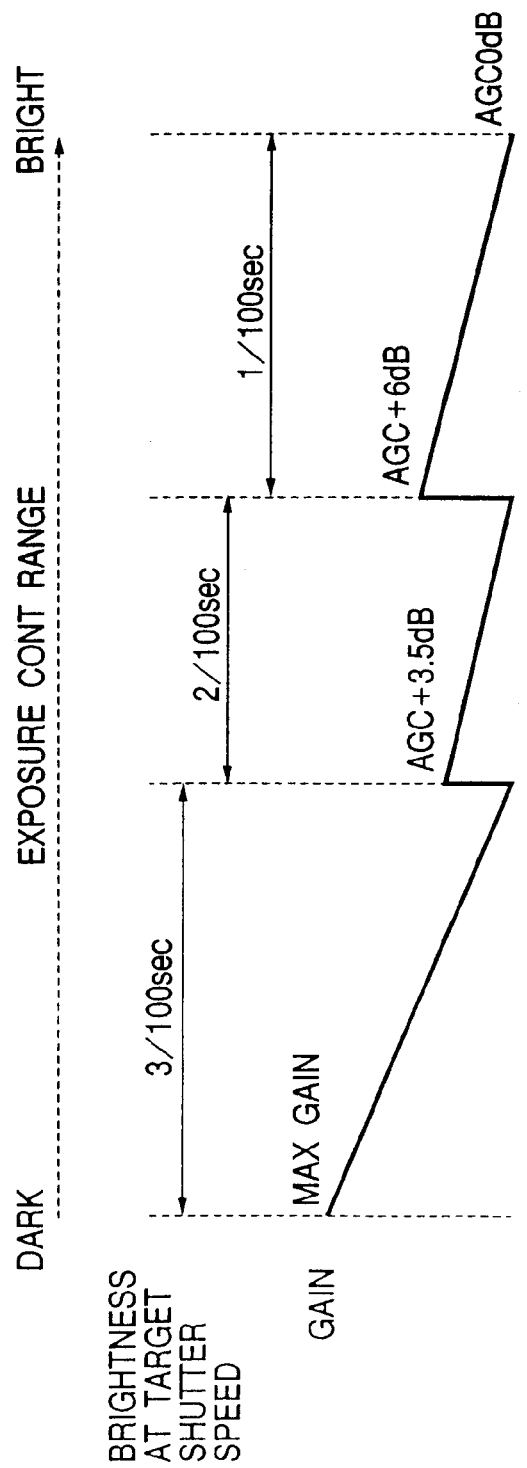
FIG. 2 is a graphical drawing of this embodiment showing variations of the shutter speed of the imager and a gain of the video signal from the imager.
Figure 4:
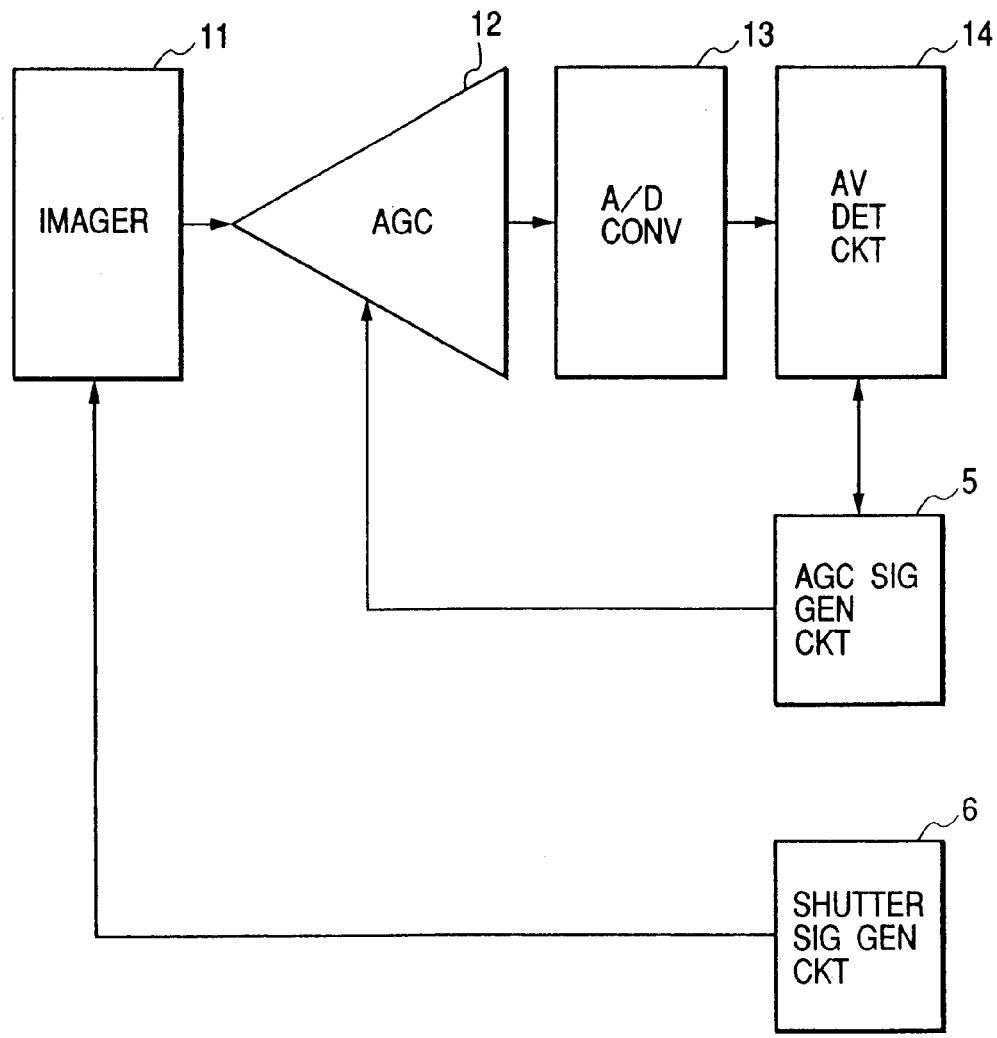

FIG. 1 shows a video signal processing apparatus of this embodiment, wherein an imager is also shown. FIG. 2 shows variations of the shutter speed of the imager and a gain of the video signal from the imager.

The video signal processing apparatus of this embodiment includes: an automatic gain controlling circuit 2 for controlling a gain of a video signal from an imager 1 having an electronic shutter function in accordance with a gain control signal; an a/d converter 3 for converting a video signal from the automatic gain controlling circuit 2 into a digital video signal, an average detecting circuit 4 for detecting an average level of a luminance signal of the digital video signal (luminance average level of the digital video signal); an automatic exposure controlling circuit 5 responsive to a mode signal indicative of the cycle per second of the ac line at the area for generating the gain control signal in accordance with the luminance average level at a unit of the voltage variation cycle period) of the ac line; and an electronic shutter control signal generation circuit 6 for generating a shutter speed control signal at the unit of the voltage variation cycle (period) of the ac line. The shutter interval of the imager is changed stepwise and each of the shutter intervals is an integer times the voltage variation cycle (period) of the ac line (the unit of voltage variation cycle).

In this embodiment, the averaging interval (time constant) is 1/30 sec, if it is assumed that the imager 1 is of the MOS type of which storing cycle is 1/30 sec.

A MOS (metal oxide semiconductor) type of imager 1 having an electronic shutter function receives a projected image thereon and converts the optical information of the projected image into a video signal. The automatic gain controlling circuit 2 of the video signal processing circuit amplifies the video signal with the gain of the video signal from an imager 1 controlled in accordance with the gain control signal. The a/d converter 3 converts the video signal from the automatic gain controlling circuit 2 into the digital video signal. The average detecting circuit 4 detects the average level of the luminance signal of the video signal. The automatic exposure controlling circuit 5 generates the gain control signal such that the luminance average level is kept constant in accordance with the luminance average level. That is, a feedback loop including the automatic gain control circuit 2, the a/d converter 3, the average detecting circuit 4, and the automatic exposure controlling circuit 5 provides an automatic gain controlling. Moreover, the automatic exposure controlling circuit 5 includes a timing signal generation circuit 5a responsive to the mode signal (50 Hz/60 Hz) to supply a timing signal indicative of the ac line voltage variation cycle (100 Hz, 120 Hz) and a setting value of the shutter interval (shutter setting value) in accordance with the luminance average level to the electronic shutter control signal generation circuit 6.

In response to the timing signal, the shutter speed control signal, the electronic shutter control signal generation circuit 6 generates the shutter speed control signal at a unit of the voltage variation cycle (period) of the ac line in accordance with the setting value of the shutter interval. The shutter interval of the imager is changed stepwise and each of the shutter intervals is an integer times the voltage variation cycle (period) of the ac line.

In FIG. 1, it is assumed that the imager 1 is of the MOS type of which storing cycle is 1/30 sec and this exposure controlling is provided for the 50-Hz-ac area.

In this case, in order to prevent flicker, the electronic shutter speed is set to be an integer times the luminance average level variation period of fluorescent lamps within the storing cycle. That is, the electronic shutter speed is controlled to be either of 3/100 sec, 2/100 sec, or 1/100 sec. Then, the automatic exposure controlling circuit 5 has three controlling modes, that is, dark, intermediate, and bright modes. That is, the automatic exposure controlling circuit 5 compares the luminance average level with two different references REF1 and REF2. When the automatic exposure controlling circuit 5 judges the luminance average level is at a dark region (dark mode), the automatic exposure controlling circuit 5 generates the shutter speed setting value of 3/100 sec. When the automatic exposure controlling circuit 5 judges the luminance average level is at an intermediate region (intermediate mode), the automatic exposure controlling circuit 5 generates the shutter speed setting value of 2/100 sec. Similarly, when the automatic exposure controlling circuit 5 judges the luminance average level is at a bright region (bright mode), the automatic exposure controlling circuit 5 generates the shutter speed setting value of 1/100 sec.

This shutter speed controlling is relatively coarse. Then, the automatic gain controlling circuit 2 further provides gain controlling every electronic shutter interval. That is, when the electronic shutter interval transients from 3/100 sec to 2/100 sec (from the dark mode to the intermediate mode), the actual storing interval becomes two thirds as shown in FIG. 2. Then, the gain of the automatic gain controlling circuit 2 is increased to +3.5 dB (ratio of shutter intervals) to make the output level of the automatic gain controlling circuit 1.5 times that at the dark region in addition to controlling the gain in inverse-proportion to the luminance average level. Accordingly, the output level of the automatic gain controlling circuit 2 is constant around the switching timing of the shutter speed. Next, the gain is gradually decreased with increase in brightness. When the electronic shutter interval transients from 2/100 sec to 1/100 sec, that is, the controlling mode moves to the bright mode, the gain of the automatic gain controlling circuit 2 is increased to +6 dB to make the output level of the automatic gain controlling circuit 2 twice that at the intermediate region. Thus, the output level of the automatic gain controlling circuit 2 is constant. Next, the gain is gradually decreased toward 0 dB at the high light. Accordingly, the output level of the automatic gain controlling circuit 2 is made constant.

As mentioned, the shutter speed is changed from 1/100 sec to 3/100 sec stepwise at the unit of the luminance variation period (voltage variation cycles per second of the ac line) of the illumination, so that the automatic exposure range is expanded. Moreover, the fine automatic gain controlling is provided every the shutter interval, so that it is possible to output the video signal without flicker. That is, the gain is offset by a ratio of the shutter intervals (3/2 or 2/1) when the luminance average level increases. Inversely, the gain is offset by a ratio of 3/2 or 2/1 when the luminance average level decreases.

At the 60-Hz-ac area, the electronic shutter speed is changed among four values, namely, 4/120 sec, 3/120 sec, 2/120 sec to 1/120 sec. Moreover, at transient of the shutter speed, the automatic gain is changed among +2.5 dB between the shutter intervals of 4/120 sec and 3/120 sec, +3.5 dB between the shutter intervals of 3/120 sec and 2/120 sec, and +6 dB between the shutter intervals of 2/120 sec and 1/120 sec. Moreover, in the case of a MOS type of imager of which storing cycle is 1/60 sec, at 60-Hz-ac area, the electronic shutter speed is changed between two values, namely, 2/120 sec and 1/120 sec.

In this embodiment, the a/d converter 3 is provided. However, the a/d converter 3 may be omitted. Moreover, the above-mentioned embodiment has been described about the MOS type of imager. However, this invention is applicable to the video signal processing apparatus for CCD type of imagers.

The video signal processing apparatus according to this invention is provided to expand the automatic exposure controlling range by changing the shutter speed stepwise from $1/100$ sec to $3/100$ sec, for example, to provide coarse exposure controlling. Moreover, fine automatic gain controlling is provided every shutter interval to suppress flicker.

What is claimed is:

1. A video signal processing apparatus comprising:

automatic gain controlling means for controlling a gain of an AGC circuit which receives a video signal from an imager having an electronic shutter function in accordance with a gain control signal;

average detecting means for detecting an average luminance level of said video signal;

gain control signal generation means for generating said gain control signal in such a manner that said average luminance level becomes a prescribed constant value; and shutter speed control signal generation means responsive to a mode signal indicative of cycles per second of an ac line for generating a shutter speed control signal at a unit of a voltage variation cycle of said ac line;

wherein:

a shutter interval of said imager decided by said shutter speed control signal generation means is selected, in accordance with an output from said average detecting means, from among one or more values of integer multiples of a time period of said voltage variation cycle within a storing cycle of said imager;

said gain control signal outputted from said gain control signal generation means is controlled stepwise, at said unit of said voltage variation cycle of said ac line, on the basis of said shutter intervals outputted from said shutter speed control signal generation means; and said gain control signal outputted from said gain control signal generation means is made inversely proportional to a changing ratio of said shutter intervals outputted from said shutter speed control signal generation means.

2. A video signal processing apparatus as claimed in claim 1, wherein said shutter interval is controlled in accordance with said detected average luminance level and the shutter speed control signal.

\* \* \* \* \*

UNITED STATES PATENT AND TRADEMARK OFFICE
CERTIFICATE OF CORRECTION

PATENT NO. : 6,882,363 B1
DATED : April 19, 2005
INVENTOR(S) : Kazuo Oda and Masaki Kariya It is certified that error appears in the above-identified patent and that said Letters Patent is hereby corrected as shown below:

Drawings,
Replace Figs. 1-5D with the attached formal drawings.

Signed and Sealed this

Twenty-third Day of August, 2005

JON W. DUDAS
*Director of the United States Patent and Trademark Office*

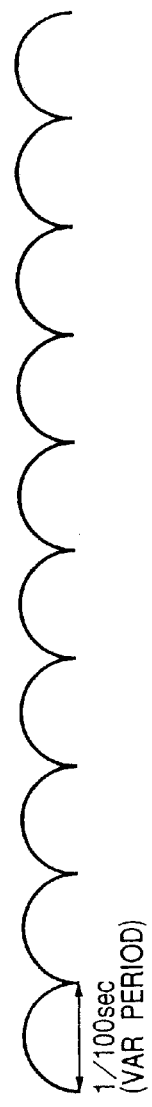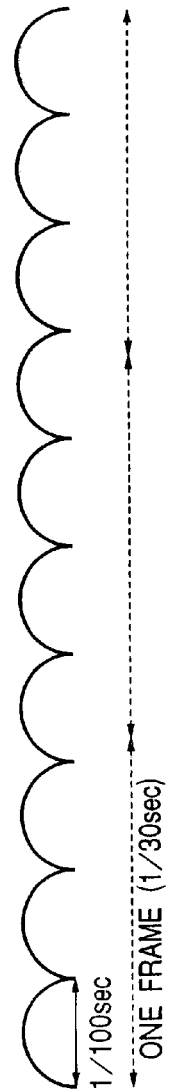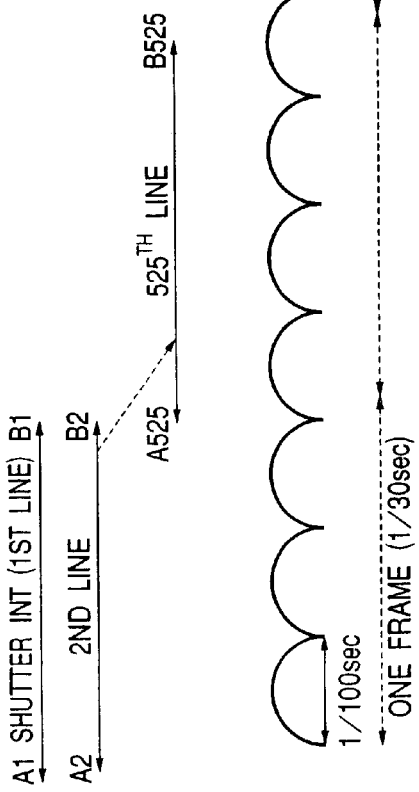
FIG. 3A PRIOR ART — AC-VOLTAGE VARIATION
FIG. 3B PRIOR ART — LUMINANCE OF FLUORESCENT LAMP
FIG. 3C PRIOR ART — STORING TIMING IN MOS IMAGER (1/30sec)
FIG. 3D PRIOR ART — LUMINANCE LEVEL OF OUTPUT VIDEO SIG

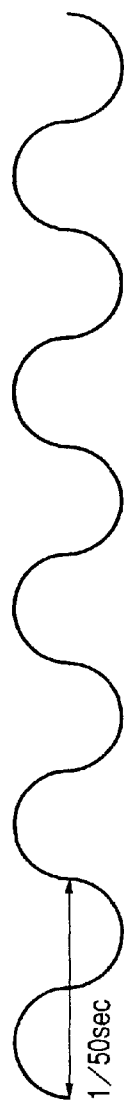
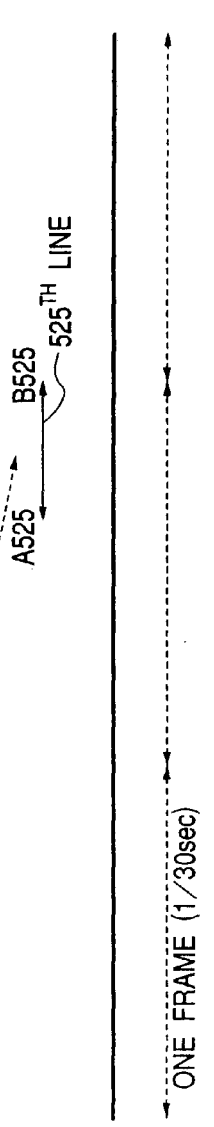
FIG. 5A PRIOR ART
AC-VOLTAGE VARIATION
FIG. 5B PRIOR ART
BRIGHTNESS VARIATION
FIG. 5C PRIOR ART
STORING TIMING
FIG. 5D PRIOR ART
LUMINANCE LEVEL OF OUTPUT VIDEO SIG